United States Patent [19]

Shimizu

[11] Patent Number: 4,949,101

[45] Date of Patent: Aug. 14, 1990

[54] FLUORESCENT PRINTER HEAD

[75] Inventor: Yukihiko Shimizu, Mobara, Japan

[73] Assignee: Futaba Denshi Kogyo Kabushiki Kaisha, Mobara, Japan

[21] Appl. No.: 422,048

[22] Filed: Oct. 16, 1989

[30] Foreign Application Priority Data

Oct. 21, 1988 [JP] Japan ................................ 63-264123

[51] Int. Cl.[5] ........................ G01D 9/42; G03G 15/00

[52] U.S. Cl. ..................................... 346/108; 346/160

[58] Field of Search ......................................... 346/160

[56] References Cited

U.S. PATENT DOCUMENTS 4,730,203 3/1988 Watanabe et al. .................. 346/160

4,803,565 2/1989 Teshigawara et al. ......... 346/160 X 4,825,230 4/1989 Shimizu .............................. 346/108

*Primary Examiner*—Donald A. Griffin

*Attorney, Agent, or Firm*—Oblon, Spivak, McClelland, Maier & Neustadt

[57] ABSTRACT

A fluorescent printer head includes a second control electrode (4) including a plurality of grid plates (5) formed with slits (6) and arranged in parallel above anodes (104), and a first control electrode (1) comprising a single plate member formed with a plurality of slits (3) and arranged above the second control electrode (4). The second control electrode (4) has a dummy grid plate (7) at each end, while the first control electrode (1) has a contiguous dummy grid section (2) at each end. This results in the electric field near the control electrodes being uniform in the longitudinal direction of anodes, preventing nonuniformity of luminance.

5 Claims, 7 Drawing Sheets

FLUORESCENT PRINTER HEAD

BACKGROUND OF THE INVENTION

1. Field of the Invention

This invention relates to a fluorescent printer head or a write head for an optical printer which comprises a vacuum fluorescent tube using the principle of a fluorescent display tube, and more particularly to a fluorescent printer head of the multi-electrode tube type.

2. Description of the Prior Art

U.S. Pat. No. 4,730,203 discloses a fluorescent printer head with a tetrode-type structure which includes two control electrodes between anodes and cathodes. FIG. 8 is a partly cutaway plan view showing such a conventional structure, generally indicated by reference numeral 100. The printer head 100 includes a substrate 101, on which a plurality of strip-like anode conductors 102 are arranged parallel to one another. On the portion of each of the anode conductors 102 opposite to a first control electrode, a continuous phosphor layer 103 is deposited, resulting in (an) anodes 104. The first control electrode will be described below.

A second control electrode 105 is located above the anodes 104 through an insulating layer (not shown) at the periphery of the substrate 101 and is thus spaced above the substrate 101 by a predetermined distance. The second control electrode 105 comprises a plurality of flat grid plates 105*a* extending obliquely across the anode conductors 102. The grid plates 105*a* are parallel to one another and are electrically separate from one another. Each of the grid plates 105*a* has a central slit-like aperture or slit also extending obliquely across the anode conductors 102, so that the portion of each of the phosphor layers defined by each of the slits 106 forms a luminous dot which emits light due to the impingement of electrons.

Insulating spacers (not shown) are located at both edges of the second control electrode 105, the first control electrode 108 is located above the second control electrode 105 with the insulating spacers between them. The first control electrode 108 is formed from a single metal plate which is larger than the second control electrode 105 and is formed with slits 109 which are larger than the slits 106 of the second control electrode 105 but which correspond positionally to the slits 106. In this way, the portions of the phosphor layers 103 of the anodes 104 exposed between adjacent grid plates 105*a* are hidden by the first control electrode 108, so that effective luminous sections are constituted by only the luminous dots 107.

The ends of the first control electrode 108 defined in the longitudinal direction of the anodes 104 have a configuration corresponding to the grid plates 105*a* at the ends of the second control electrode 105 and the slits 106 and 109; thus, each end is formed obliquely across the longitudinal direction of the anodes 104. The ends of the phosphor layers 103 of the anodes 104 are progressively displaced across the ends of the first control electrode 108, so that as a whole, the ends are arranged obliquely. Also, the phosphor layers 103 are formed so that they do not protrude laterally beyond the first control electrode 108, and so only the anode conductors 102 are exposed beyond the ends of the first control electrode 108. Alternatively, the phosphor layers 103 can be deposited over the entire respective anode conductors 102 and those portions of the phosphor layers protruding beyond the first control electrode 108 can be covered with a coating layer, in order to prevent any light being emitted from these portions.

The conventional printer head also includes filamentary cathodes 200 extending above the first control electrode 108. A casing comprising side plates 201 and a front cover 202 is bonded on to the substrate 101 by means of a sealing material, resulting in an envelope, which is then evacuated to form a high vacuum atmosphere therein.

Electrodes, such as grid terminals and the like, are led out from the so-formed vacuum envelope and are then connected to a driver circuit (not shown). The anodes 104 are scanned with a time-division pulse signal and a positive display pulse signal is supplied to the desired grid plate(s) of the second control electrode 105 in synchronism with the scanning, resulting in the luminous dots of the phosphor layers 103 selectively omitting light as desired.

This conventional fluorescent printer head 100 is located adjacent a photosensitive drum in a printer so that the anodes 104 are parallel to the photosensitive drum. When the timing of luminescence of the luminous dots is suitably adjusted depending on the rotation of the photosensitive drum, lights emitted from the luminous dots 107 are continuously irradiated onto the surface of the photosensitive drum so as to form a straight line on the drum, parallel to its axis resulting in characters, figures or the like being formed on the drum surface.

The conventional fluorescnet printer head 100 constructed as described above causes a difference in luminance to occur between a luminous dot 107 at the central region of each anode (in its longitudinal direction) and a luminous dot 107 at either end of the anode 104 as shown in FIG. 7. In FIG. 7, the x-axis indicates the number on grid plates 105*a* arranged in the longitudinal direction of the anodes 104 and the y-axis indicates the relative luminance of each of the luminous dots 107. As can be seen from FIG. 7, in the conventional printer head 100, the luminance of the luminous dots at the ends of each anode 104 is decreased compared with that of a luminous dot in the central region of the anode 14, resulting in a nonuniformity of luminance. This nonuniformity in the luminance renders the density of an image nonuniform, so that the quality of printing is unsatisfactory.

Also, in the conventional printer head 100, the ends of each of the phosphor layers 103 are formed obliquely to conform with the ends of the first and second control electrodes 105 and 108. Alternatively, phosphor layer 103 must be formed over the entire corresponding anode conductor and the unnecessary portion of the phosphor layer 103 must be covered with a coating layer. However, each of the approaches causes manufacturing of the printer head to be troublesome and complicated, leading to an increase in manufacturing costs.

SUMMARY OF THE INVENTION

The present inventor believes that the first problem of the conventional printer head described above is due to a difference in electric field in the slits 106 and 109 defining the luminous dots 107 between the central region of the control electrodes 104 and its ends. Furthermore, this difference is believed to be due to a difference in structure between the two ends of each of the first and second control electrodes 108 and 105 and its central region. More particularly, the present inventor has come to the conclusion that at the central region of the first control electrode 108, relatively wide portions extend from both sides of the slit 109, whereas at the ends, a relatively wide portion extends from only one side of the slit 109. Similarly, in the central region of the second control electrode 105, both electrode portions on each side of the slit are minus, whereas only one electrode portion is minus at each end of the second control electrode.

It is an object of the present invention to provide a fluorescent printer head which does not exhibit a decrease in luminance at the ends of each anode, in order to eliminate any nonuniformity of luminance of the printer head.

It is another object of the present invention to provide a fluorescent printer head in which the pattern of arrangement of the phosphor layer at the end of the anode is simplified, resulting in the deposition of the phosphor layer being facilitated.

In accordance with the present invention, there is provided a fluorescent printer head comprising: a substrate; a plurality of strip-like anode conductors arranged on the substrate so as to extend in the longitudinal direction of the substrate; a phosphor layer deposited on each anode conductor forming an anode in cooperation with the anode conductor; a second control electrode comprising a plurality of grid plates arranged in parallel above the anodes, each formed with a slit; a first control electrode comprising a single plate member formed with a plurality of slits and arranged above the second control electrode; filamentary cathodes extending above the first control electrode; and an envelope or housing in which the anodes, control electrodes and filamentary cathodes are arranged and which is evacuated to a high vacuum; the second control electrode being provided at its two longitudinal ends with a dummy grid plate; the first control electrode being provided at its two longitudinal ends with a dummy grid section in a manner to be contiguous thereto.

In the fluorescent printer head of the present invention constructed as described above, the first control electrode is provided with the dummy grid sections and the second control electrode is provided with the dummy grid plates, so that the overall electric field of the control electrodes may be made uniform to a degree sufficient to render the electric field at the ends of the control electrodes substantially equal to that at the central region. This effectively prevents a decrease in luminance at the ends of the anode and causes unnecessary luminescence at the ends of the anode to be shielded positively.

BRIEF DESCRIPTION OF THE DRAWINGS

These and other objects and many of the attendant advantages of the present invention will be readily appreciated as the same becomes better understood by reference to the following detailed description when considered in connection with the accompanying drawings in which like reference characters designate the same parts throughout and wherein.

DETAILED DESCRIPTION OF THE PREFERRED EMBODIMENTS

The present invention is centered upon the structure of first and second control electrodes, and the remainder of each of the embodiments may be constructed in substantially the same manner as the conventional fluorescent printer head described above, except that each of phosphor layers 103 is deposited over the entire corresponding anode conductor 101. Accordingly, the following description will concentrate upon the control electrodes.

Figure 1:
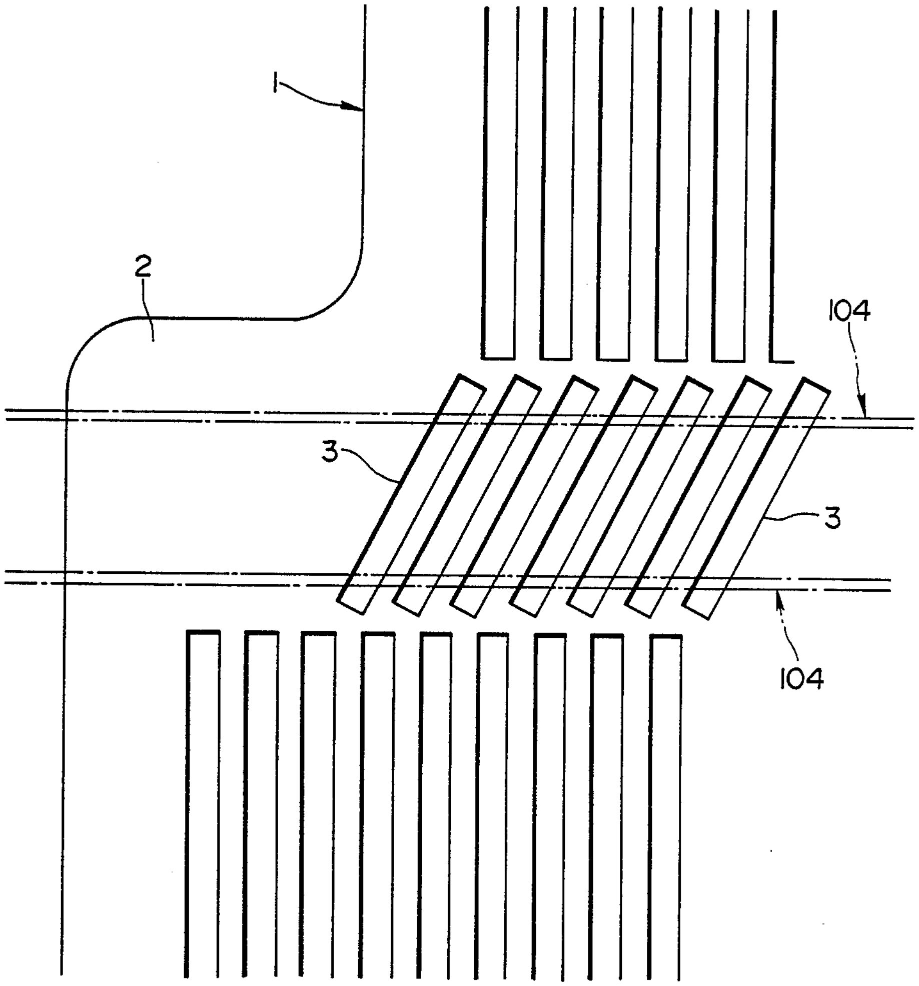
FIG. 1 is a fragmentary plan view showing the first control electrode in a first embodiment of a fluorescent printer head according to the present invention.
Figure 5:
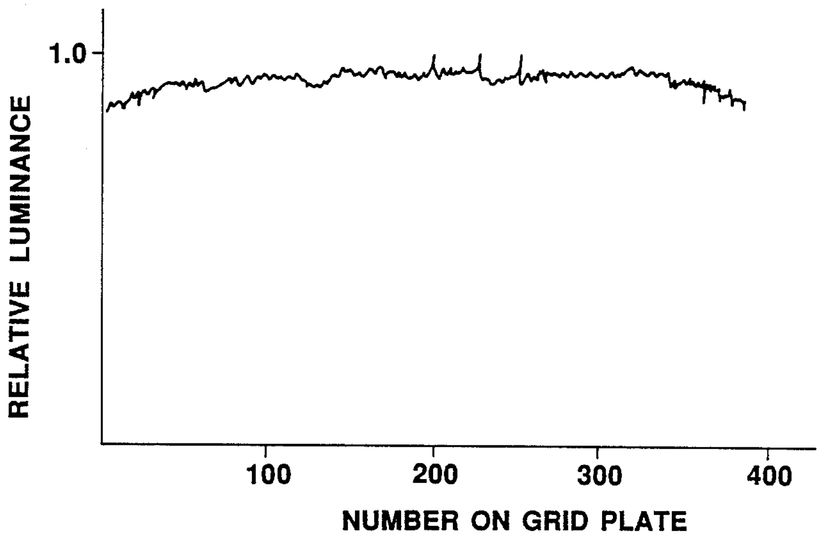
FIG. 5 is a graphical representation showing the effect of the first embodiment.

The first embodiment of the present invention will be described with reference to FIGS. 1, 2 and 5.

In the fluorescent printer head of this embodiment, a first control electrode 1 is so constructed that both its ends extend contiguously in the longitudinal direction of anodes 104 to form a plate-like dummy grid section 2. The dummy grid section 2 is free of any slit 3, and so hides the end of each of the anodes 104. Thus, the illustrated embodiment permits the luminescence of the phosphor layers 103 to be observed only through the slits 3, although the phosphor layers 102 are deposited all over each of the anode conductors 102 as described above. The reason for this is that unnecessary luminescence of the phosphor layers 103 is shielded by the dummy grid sections 2. Also, the presence of the dummy grid section 2 causes the electric field near the slit 3 at each end of the first control electrode 1 to equal substantially or to approach that near the central region. This results in the number of electrons passing through the slit 3 at the end of the first control electrode 1 being substantially equal to the number passing through a slit 3 at the central region of the control electrode 1, so that each of the strip-like anodes 104 may carry out uniform luminescence or light emission as compared with that in the conventional fluorescent printer head, as shown in FIG. 5.

Figure 2:
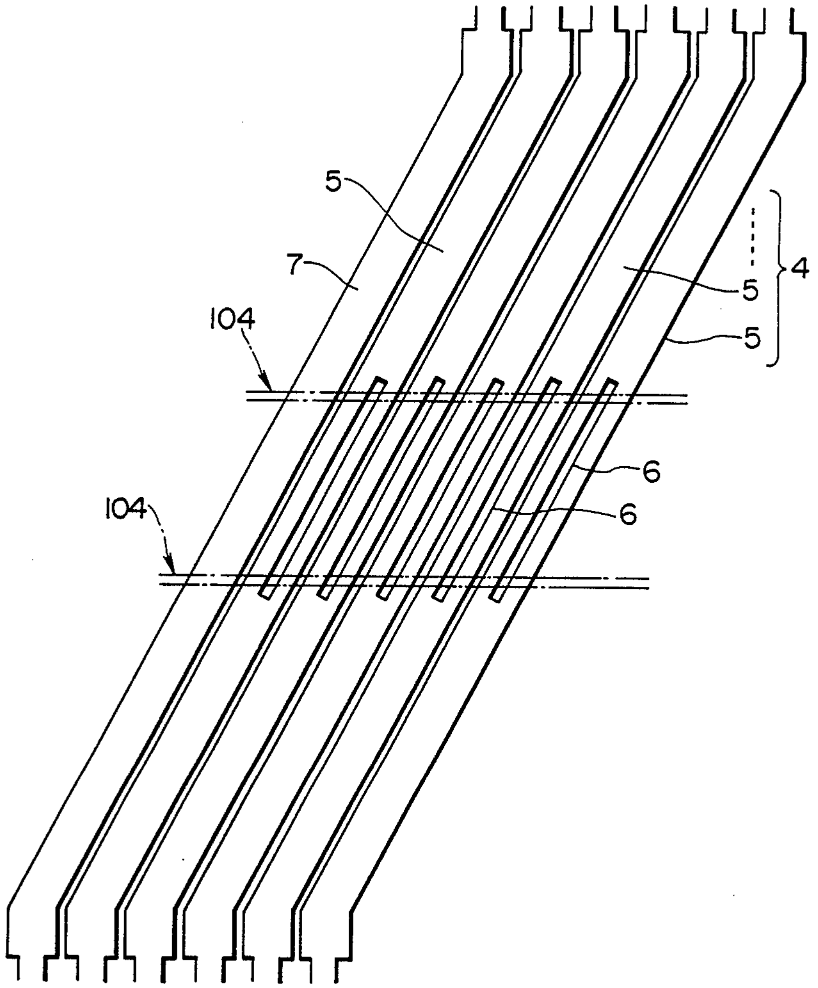
FIG. 2 is a fragmentary plan view showing the second control electrode in the first embodiment.

As shown in FIG. 2, the second control electrode 4 is provided at each end with a dummy grid plate 7 having the same outer configuration as each of the grid plates 5, but free of any slit 6. This construction results in the electric field between the end grid plate 5 and the first control electrode 1 being substantially equal to or approaching that between a central grid plate 5 and the first control electrode 1. Thus, electrons passing through each of the slits 3 of the first control electrode 1 then pass through the so-formed uniform electric field between the first and second control electrodes 1, 4. They subsequently pass through the slits 6 of the second control electrode 4, and impinge upon the phosphor layers 3, so that the phosphor layers 4 may emit light uniformly. The dummy gride plate 7 may of course be provided with the slit 6; this would not affect its function.

As described above, the first embodiment permits the anode 104 to emit light uniformly in the longitudinal direction. Also, each end of the anode 104 is convered with the dummy grid section 2, so that any unnecessary luminescence of the anode 104 is effectively shielded. Thus, in this embodiment, it is simpler to manufacture the fluorescent printer head because the step of providing the phosphor layer with a coating layer when the phosphor layer is deposited on the anode conductor 102, is eliminated.

In the illustrated embodiment, the first control electrode 1 has at each end a dummy grid section 2 free of any slit to cause electric field at the ends to equal that at its central region. However, in the central region, the first control electrode 1 each slit 3 has a pair of adjacent slits which are the same size, whereas at the ends of the first control electrode 1, the end slit 3 has only one adjacent slit 3 positioned to the inside while the dummy grid section 2 is arranged on the outside.

Thus, the structure of the central region of the first control electrode 1 is somewhat different from that of its ends, and this fails to provide an electric field at the central region which is absolutely identical with the electric field at the two ends. In fact, electrons are attracted by the dummy grid sections 2, so that the number of electrons passing through the slit 3 at each end of the first control electrode 1 is somewhat less than the number of electrons passing through a slit 3 positioned in the central region, although the number of electrons passing through the end slits 3 approaches the number passing through a central slit sufficiently to solve the practical problem of the conventional fluorescent printer head. Ideally, however, there is room for a further improvement in obtaining an even more uniform luminance of the strip-like anode 104 in its longitudinal direction.

Figure 3:
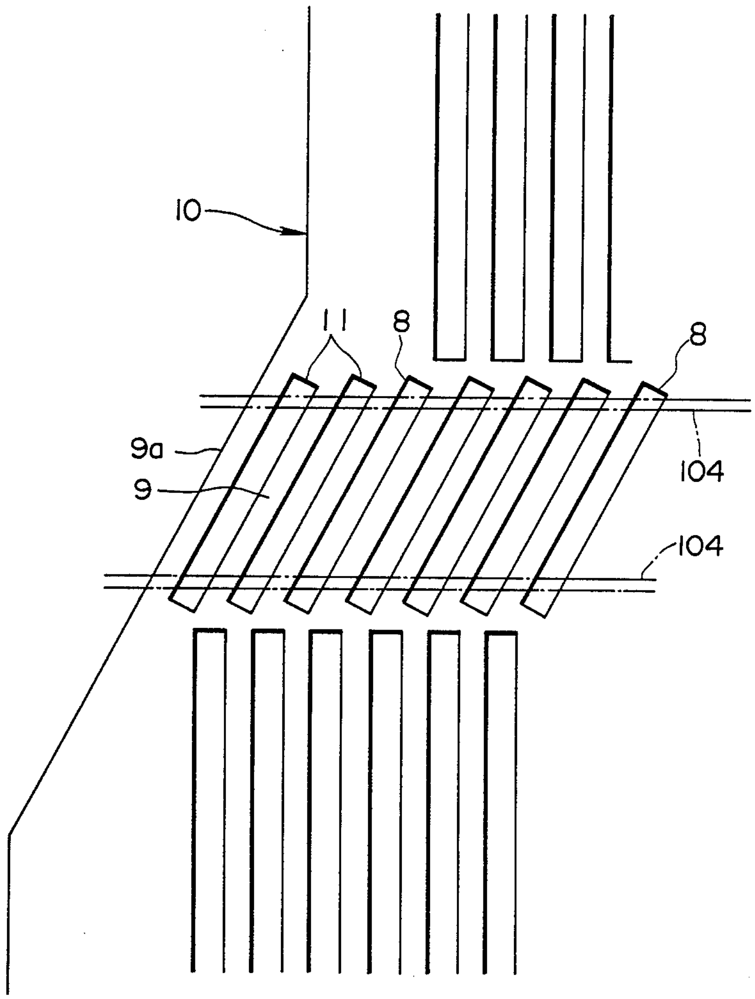
FIG. 3 is a fragmentary plan view showing the first control electrode in a second embodiment of a fluorescent printer head according to the present invention.
Figure 4:
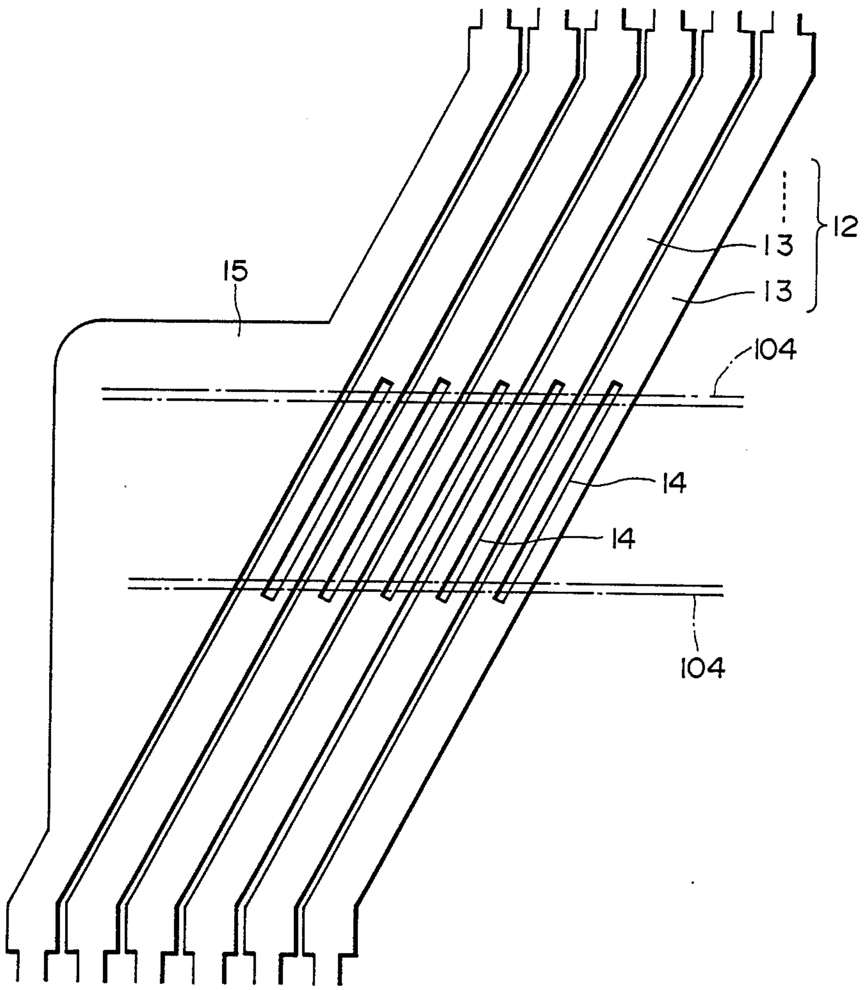
FIG. 4 is a fragmentary plan view showing the second control electrode in the second embodiment.
Figure 6:
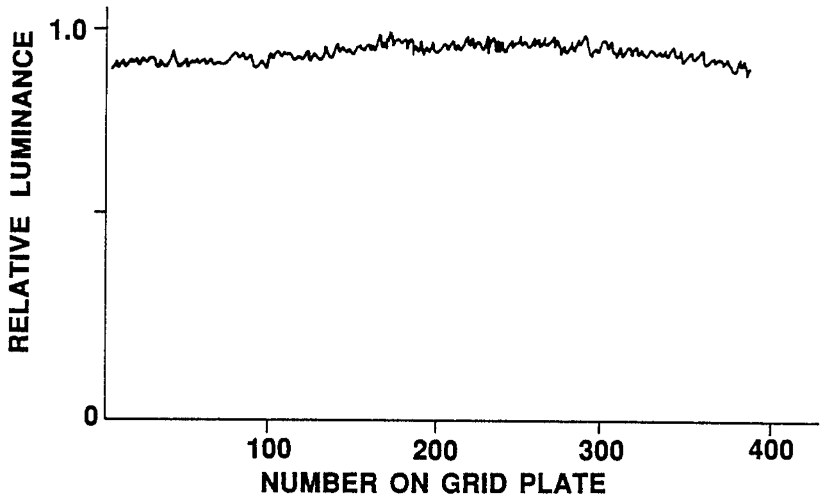
FIG. 6 is a graphical representation showing the effect of the second embodiment.
Figure 7:
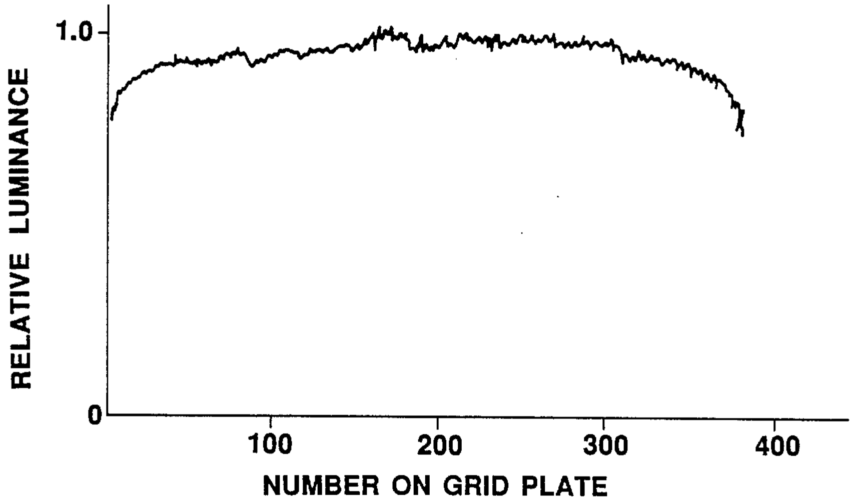
FIG. 7 is a graphical representation showing the nonuniformity of luminance caused by a conventional fluorescent printer head.
Figure 8:
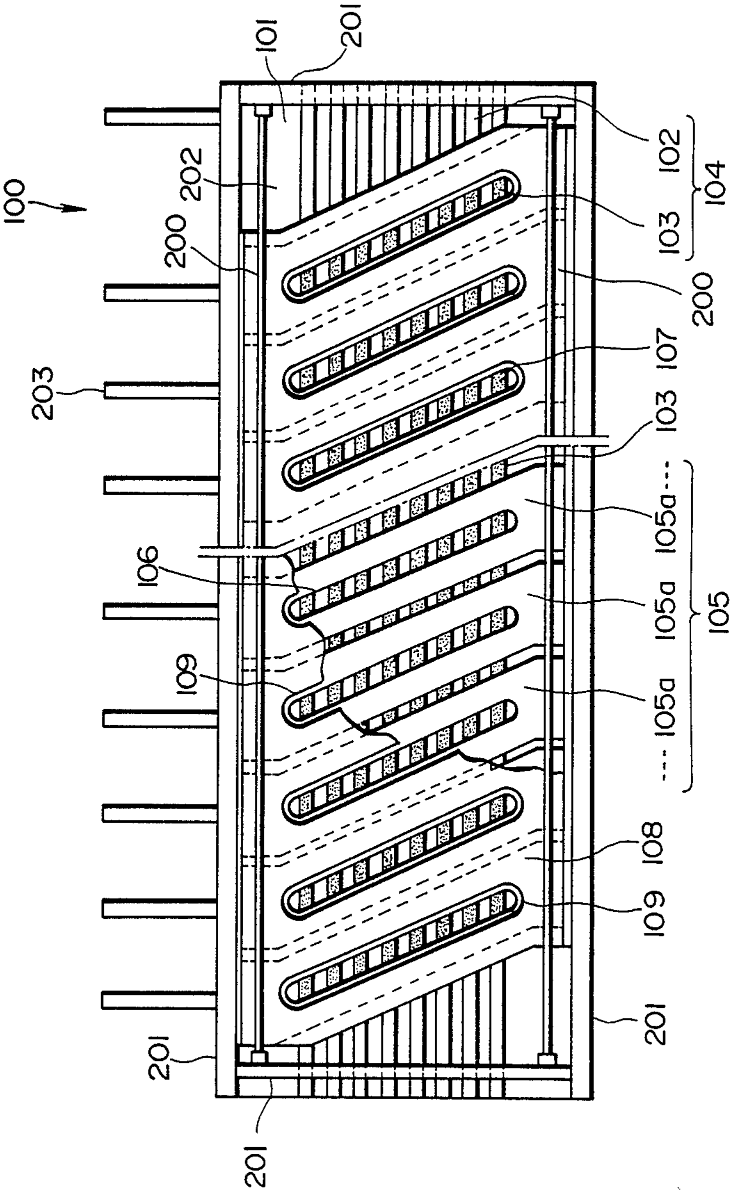
FIG. 8 is a partly cutaway front elevation view showing a conventional fluorescent printer head in which its central section is deleted for the sake of brevity.

The second embodiment of the present invention shown in FIGS. 3, 4 and 6 addresses the minor disadvantage which may be encountered with the first embodiment. The second embodiment sets out to render even more uniform the luminescence of the anode 104 as compared with the first embodiment by improving further the configuration of the control electrodes.

In the illustrated embodiment, the first control electrode 10, as shown in FIG. 3, has an integral dummy grid section 9 at each end with a terminal edge 9*a* formed parallel to the slits 8. The dummy grid section 9 is formed with two dummy slits 11 of the same configuration as the slits 8 at the same intervals as the slits 8. This arrangement results in each of the outermost slits 8 of the first control electrode 10 being located between the adjacent slit 8 and the adjacent dummy slit 11 in the same way as a central slit 8 is interposed between two adjacent slits 8. Thus, the two end slits 8 have the same effective construction as the central slits 8 so that the electric field near each end slit 8 may be substantially the same as that near the central slits 8. This results in the number of electrons passing through any of the slits 8 being rendered uniform, so that the strip-like anodes 104, as shown in FIG. 6, each may exhibit an even more uniform luminescence than the first embodiment.

Also, in the second embodiment, as shown in FIG. 4, the second control electrode 12 has a dummy grid plate 15 at each end, whose configuration is different from the grid plates 13 and is free of any slit 14. The dummy grid plate 15 extends in the longitudinal direction of the anodes 104, and so has a larger area than the dummy grid plate 7 of the first embodiment. The dummy grid plate 15 covers or shields the end of the anode 104 so that any unnecessary luminescence of the phosphor layer 103 will not be observed through the dummy slit 11.

It might be thought that the dummy grid plate 15 with its larger area might cause the electric field at the end grid plates 13 to be different from that at the central grid plates 13. However, the electrons are converged and accelerated by the first control electrode 10, which results in their entering the slits 14 of the second control electrode 12 near the first control electrode 10 at a considerably high speed. Thus, the disturbance of the electric field by the dummy grid plate 15 does not substantially affect the electrons.

In the second embodiment, each end of the anode 104 is covered by the dummy grid plate 15 which has a plate-like shape with a large width, so as to shield unnecessary luminescence from the anode 104. However, the second embodiment may be so constructed that the dummy grid plate 15 has the same shape as the grid plate 13 and is free of any slit 14 as in the first embodiment, while the anode 104 is covered at each end with an insulating layer. Also, each of the dummy grid sections 9 of the first control electrode 10 is provided with two dummy slits 11. However, the number of dummy slits 11 may be one or more than two.

As can be seen from the foregoing, the fluorescent printer head or the write head for the optical printer according to the present invention includes at least two control electrodes and is so constructed that the first control electrode on the cathode side is provided at each end with a contiguous dummy plate section, and the second control electrode on the anode side is provided at each end with a dummy grid plate. Such a construction permits the electric field near the control electrodes in the longitudinal direction of the anodes to be uniform, resulting in the elimination of any decrease in luminance at the ends of each anode. Thus, the write head or fluorescent printer head of the present invention effectively avoids nonuniformity of luminance. Also, with the present invention, the control electrodes readily shield the unnecessary end portions of each anode, so that the pattern of arrangement of the phosphor layer at the end of the anode may be simplified, resulting in the deposition of the phosphor layer being facilitated.

While preferred embodiments of the invention have been described with certain degree of particularity with reference to the drawings, obvious modifications and variations are possible in the light of the above teachings. It is therefore to be understood that within the scope of the appended claims, the invention may be practiced otherwise than as specifically described.

What is claimed as new and desired to be secured by Letters Patent of the United States is:

1. A fluorescent printer head comprising:
   - a substrate;
   - a plurality of strip-like anode conductors arranged on said substrate so as to extend in the longitudinal direction of said substrate;
   - a phosphor layer deposited on each of said anode conductors to form an anode in cooperation with said anode conductor;
   - a second control electrode comprising a plurality of grid plates arranged in parallel above said anodes, each formed with a slit;

a first control electrode comprising a single plate member formed with a plurality of slits and arranged above said second control electrode;

filamentary cathodes extending above said first control electrode; and an envelope in which said anodes, control electrodes and filamentary cathodes are arranged and which is evacuated to a high vacuum;

said second control electrode being provided at each of its longitudinal ends with a dummy grid plate;

said first control electrode being provided at each of its longitudinal ends with a contiguous dummy grid section.

2. A fluorescent printer head as defined in claim 1, wherein said dummy grid sections of said first control electrode each have a plate-like shape so as to cover the end of each of said strip-like anodes.

3. A fluorescent printer head as defined in claim 1, wherein said dummy grid sections of said first control electrode each have at least one slit of the same configuration as said slits of said first control electrode.

4. A fluorescent printer head as defined in claim 1, wherein said dummy grid plates of said second control electrode each have a single plate-like shape so as to cover the end of said strip-like anode.

5. A fluorescent printer head as defined in claim 1, wherein said dummy grid plates each have the same configuration as said second control electrode and are free of any slit.

* * * * *